United States Patent Office 2,799,590
Patented July 16, 1957

2,799,590

GLASS

William H. Armistead, Corning, N. Y., assignor to Corning Glass Works, Corning, N. Y., a corporation of New York No Drawing. Application May 21, 1954,
Serial No. 431,599

4 Claims. (Cl. 106—53)

This invention relates to glass compositions and has for its primary object a composition having viscosity characteristics such that it can be drawn in a continuous sheet 0.13–0.16 mm. thick by the down-draw process by automatic apparatus such as is described in Patent No. 2,422,466, and at the same time having a chemical durability making it suitable for cover glasses for microscope slides, dielectric laminations for fixed capacitors, and the like.

To produce sheets of a quality suitable for these purposes and in an economically large volume, it is particularly desirable to form the sheet by the automatic down-draw process. A sheet so formed has polished surfaces that require no subsequent polishing and its thickness may normally be controlled within narrow limits by suitably varying the temperature and viscosity of the molten glass.

To obtain a sufficiently high viscosity to enable prior glasses, otherwise suitable for the present purpose, to be drawn in the desired thinness it was found that the temperature of the molten glass must be lowered to such a degree that it is near or below the liquidus of the glass, the highest temperature at which crystals of any kind can form or separate from the molten glass in equilibrium with the glass. Such attempts, therefore, result in objectionable crystallization of the molten glass either in the body of the glass or at the edges of the drawing orifice and crystals appear in the drawn sheet or on its surface.

It is known that the liquidus of a glass can be raised or lowered by changing its composition and, while it might appear to be a simple matter to modify the composition of the prior glasses so as to suitably lower the liquidus thereof, it was found that such composition changes as were heretofore known for this purpose cause an objectionable decrease in its chemical durability or other change in properties making it unsuitable for microscope cover glasses and the like.

I have now discovered that the introduction of 2–8% of $TiO_2$ into the composition of glasses which otherwise have too high liquidus or too low chemical durability results in a favorable change of both the liquidus and the durability rendering them suitable for the present purpose. It was not heretofore known that such an amount of $TiO_2$ would have such an effect on a particular glass composition and in fact large amounts of $TiO_2$ are known to increase the liquidus of some glasses.

The new compositions fall within a narrow range which, according to the invention, consists essentially by analysis by weight of 59% to 67% $SiO_2$, 2% to 8% $TiO_2$, the total $SiO_2$ and $TiO_2$ being 62% to 75%, 3% to 13% $Na_2O$, 3% to 13% $K_2O$, the total $Na_2O$ and $K_2O$ being 12% to 16%, 4% to 12% $B_2O_3$, 4% to 15% of a member of the group of divalent metal oxides selected from the class consisting of ZnO, ZnO plus MgO, ZnO plus PbO, and ZnO plus MgO plus PbO, the amount of ZnO being at least 4% and being at least one-half of the total amount of such divalent metal oxides, and $Al_2O_3$ in an amount not exceeding 5%, the total $B_2O_3$, divalent metal oxide and $Al_2O_3$ being 9% to 23%.

Preferably the divalent metal oxide should consist of ZnO but it may also comprise MgO and/or PbO provided that the ZnO content of the glass is at least 4% and amounts to at least one-half of the total percentage of the divalent metal oxides. Substantial amounts of the oxides of the other metals of the second periodic group, particularly BaO, should be absent since they undesirably lower the chemical durability of the glass.

To be suitable for microscope cover glasses having the requisite thinness the glass should have at least as good chemical durability as the prior glasses which are satisfactory in such respect but which, on account of their unfavorable viscosity characteristics, have heretofore been produced in the desired thinness only by the blowing method. One test, which is performed on the powdered glass, comprises determining the amount of alkali dissolved from the powdered glass after being suspended in water for four (4) hours by measuring the pH of the suspension. The pH so measured should not exceed about 9.2.

Another test comprises immersing a stack of pre-washed microscope cover glasses composed of the glass to be tested in distilled water free of $CO_2$, to which has been added a small amount of phenolphthalein, and observing the presence or absence of color in the water between the plates due to leaching of alkali therefrom after a one hour immersion. No color should be discernible. Glasses which are unsuitable for the present purpose according to such tests are also insufficiently resistant to attack by acid and alkaline solutions.

Only the above-indicated range of constituents will produce glasses having the desired properties and variations in their proportions should be confined within the limits of such range for the following reasons.

An objectionably high liquidus results from an excess of either $SiO_2$ or $TiO_2$ or ZnO, or from a deficiency of either $B_2O_3$ or ZnO or alkali metal oxide.

An undesirably low chemical durability is caused on the one hand by an excess of either $Al_2O_3$ or $B_2O_3$ or ZnO or alkali metal oxide, or on the other hand by a deficiency of either $SiO_2$ or $TiO_2$ or ZnO.

An excess of $Al_2O_3$ also tends to adversely affect the meltability of the glass.

The following examples, calculated in weight percent on the oxide basis from their batches, illustrate glass compositions falling within the scope of this invention:

|  | 1 | 2 | 3 | 4 | 5 | 6 |
|---|---|---|---|---|---|---|
| $SiO_2$ | 62 | 64 | 67 | 62 | 65 | 65 |
| $TiO_2$ | 5 | 5 | 3 | 8 | 5 | 4 |
| $Na_2O$ | 7 | 7 | 9 | 3 | 6 | 7 |
| $K_2O$ | 7.8 | 7 | 4 | 12 | 6 | 7 |
| $B_2O_3$ | 9.2 | 8 | 4 | 10 | 5 | 4 |
| ZnO | 7 | 7 | 4 | 5 | 5 | 12 |
| MgO |  |  | 4 |  |  |  |
| PbO |  |  |  |  | 5 |  |
| $Al_2O_3$ | 2 | 2 | 5 |  | 3 | 1 |

Ordinarily, when a borosilicate glass containing substantial amounts of alkali metal oxide and $B_2O_3$ is melted in a tank furnace, an appreciable amount of alkali metal oxide and $B_2O_3$ is lost by evaporation and the analytical amounts of the less volatile constituents, particularly $SiO_2$, are correspondingly and proportionately increased. In the present range of compositions the total of such loss amounts to about 2%. For such melting, therefore, a final composition will have by analysis a somewhat higher $SiO_2$ content and somewhat lower alkali metal oxide and $B_2O_3$ contents than the original composition as calculated from its batch. When melted on a small scale or under conditions not conducive of evaporation, the final analytical composition is substantially the same as calculated. For instance, when the batch of Example 1 is melted in a tank furnace, its oxide composition is sufficiently altered by evaporation that the analytical composition of the final glass is substantially the same as the calculated composition designated Example 2. On the other hand, when the batch of Example 2 is melted in a small crucible, the analytical composition of the final glass is substantially its calculated composition and its liquidus is substantially the same as that of Example 1 when the latter is melted in a tank furnace.

To draw glasses of the present type by means of the apparatus described in the above mentioned patent in a thickness of 0.13–0.16 mm. from an orifice having a thickness of ⅜ inch, a viscosity of 30,000–40,000 poises and a linear drawing speed of 200 feet per minute is required and the temperature of the glass at the orifice is 935°–955° C. The liquidus of each of the compositions described above is below 935° C. and the chemical durability of each glass is ample for the present purpose. On the contrary as has been pointed out above, with proportions falling outside of the above-recited range the glass will either have a liquidus above 950° C. or have an undesirably low chemical durability rendering it unsuitable for microscope cover glasses and the like.

I claim:

1. A glass consisting essentially by analysis by weight of 59% to 67% $SiO_2$, 2% to 8% $TiO_2$, the total $SiO_2$ and $TiO_2$ being 62% to 75%, 3% to 13% $Na_2O$, 3% to 13% $K_2O$, the total $Na_2O$ and $K_2O$ being 12% to 16%, 4% to 12% $B_2O_3$, 4% to 15% ZnO, 0 to 7½% MgO, 0 to 7½% PbO, the total of the said divalent metal oxides being not over 15% and the total MgO plus PbO not exceeding the amount of ZnO, and $Al_2O_3$ in an amount not exceeding 5%, the total $B_2O_3$, said divalent metal oxide and $Al_2O_3$ being 9% to 23%.

2. The glass claimed in claim 1, in which the divalent metal oxide consists of ZnO.

3. A glass having the approximate analytical composition 64% $SiO_2$, 5% $TiO_2$, 7% $Na_2O$, 7% $K_2O$, 8% $B_2O_3$, 7% ZnO and 2% $Al_2O_3$ by weight.

4. A glass having the approximate analytical composition 62% $SiO_2$, 5% $TiO_2$, 7% $Na_2O$, 7.8% $K_2O$, 9.2% $B_2O_3$, 7% ZnO, and 2% $Al_2O_3$ as calculated from its batch by weight.

References Cited in the file of this patent
UNITED STATES PATENTS

Re. 23,049     Armistead _____ Nov. 23, 1948